United States Patent [19]
Labatte et al.

[11] Patent Number: 5,913,057
[45] Date of Patent: Jun. 15, 1999

[54] HIDDEN HEADERS FOR PROTECTING COMPUTER SYSTEM DATA

[75] Inventors: Timothy E. W. Labatte; Orville H. Christeson, both of Portland; Mark S. Shipman, Hillsboro, all of Oreg.

[73] Assignee: Intel Corporation, Santa Clara, Calif.

[21] Appl. No.: 08/768,644

[22] Filed: Dec. 18, 1996

[51] Int. Cl.⁶ .................................................. G06F 9/06
[52] U.S. Cl. ......................... 395/652; 395/186; 395/163
[58] Field of Search .................................. 395/651, 652, 395/653, 186, 188.01, 163, 164

[56] References Cited

U.S. PATENT DOCUMENTS 4,890,223  12/1989  Cruess et al. .......................... 364/200
5,297,268  3/1994  Lee et al. ............................... 395/425
5,592,641  1/1997  Fandrich et al. ........................ 395/430

*Primary Examiner*—Kevin A. Kriess
*Attorney, Agent, or Firm*—William H. Murray; N. Stephan Kinsella

[57] ABSTRACT

A request is received from a caller to perform a read of data from a storage area of a computer system, the data having master header data in a header portion. The master header data is replaced with alternate header data before returning the data to the caller. The data, including the alternate header data, is returned to the caller. A request is received from the caller to perform a write of caller data to the storage area, the caller data having caller header data in a header portion of the caller data. The write of caller data is allowed only if the caller header data is identical to the master header data.

15 Claims, 2 Drawing Sheets

100

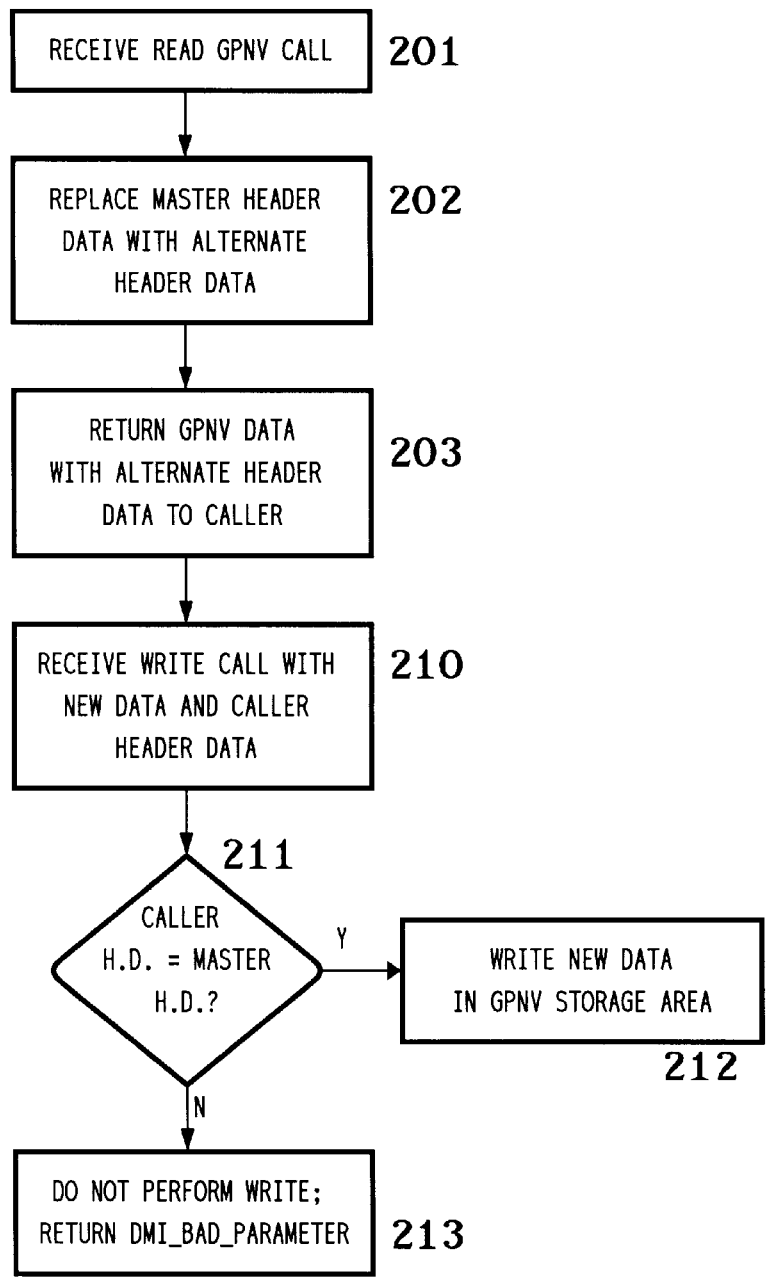

HIDDEN HEADERS FOR PROTECTING COMPUTER SYSTEM DATA

BACKGROUND OF THE INVENTION

1. Field of the Invention

The present invention relates to the field of data storage in a computer system and, more particularly, to prevention of unauthorized changes to data stored in a computer system.

2. Description of the Related Art

Computer technology is continuously advancing, resulting in modem computer systems that provide ever-increasing performance. One result of this improved performance is an increased use of computer systems by individuals in a wide variety of business, academic and personal applications. With the increased use of and demand for computer systems, a large number of manufacturers, developers, and suppliers of computer systems, components, and software have come into existence to service the demand.

The large number of manufacturers, developers, and suppliers, combined with the flexibility afforded them due to the advances in technology, has resulted in a wide range of methods by which computer systems operate. Typically, in order for different components within a computer system to work together effectively, each must agree on certain specific operating parameters. Often, standards or specifications are adopted or agreed upon by various industries or groups of companies which define certain operating parameters. Thus, if two components comply with the same standard(s) or specification(s), then the two components should be able to work together effectively in the same system.

For example, one such standard is the Plug and Play BIOS [basic input/output system] Specification (version 1.0A, May 5, 1994). A component which conforms to the Plug and Play BIOS Specification should work properly in a system which also complies with the Plug and Play BIOS Specification by simply interconnecting the components to the system. Components that do not comply with the Plug and Play BIOS Specification may require additional configuration steps to be taken by the user before they function properly with one another.

Another current standard is the Desktop Management BIOS specification (version 2.0, published Mar. 6, 1996) (hereinafter referred to as the DMI BIOS Specification), the entirety of which is incorporated herein by reference. This specification includes a Desktop Management Interface (DMI). The DMI BIOS Specification provides, among other advantages, general purpose nonvolatile (GPNV) data areas which can be accessed to store various data by various applications running on the system.

The DMI BIOS Specification, however, lacks suitably flexible mechanisms to prevent an application from performing an unauthorized modification of data stored in one of these GPNV data areas. For example, a GPNV data area may store vital manufacturing data the modification of which may be done for fraudulent purposes. Thus, it would be beneficial to provide mechanisms for restricting write access to selected GPNV data areas to prevent unauthorized changes to the data stored therein.

Additionally, in order to maintain compliance with the DMI BIOS Specification, any protection against unauthorized updates to GPNV data areas must not violate the DMI BIOS Specification.

SUMMARY

Unauthorized write access to a storage area in a computer system is prevented by receiving a request from a caller to perform a read of data from the storage area, the data having master header data in a header portion. The master header data is replaced with alternate header data before returning the data to the caller. The data, including the alternate header data, is returned to the caller. A request is received from the caller to perform a write of caller data to the storage area, the caller data having caller header data in a header portion of the caller data. The write of caller data is allowed only if the caller header data is identical to the master header data.

BRIEF DESCRIPTION OF THE DRAWINGS

These and other features, aspects, and advantages of the present invention will become more fully apparent from the following description, appended claims, and accompanying drawings in which:

FIG. 2 is a flow chart illustrating a method of protecting storage areas from unauthorized writes by using hidden headers, in accordance with an embodiment of the present invention.

DESCRIPTION OF THE PREFERRED EMBODIMENT

Figure 1:
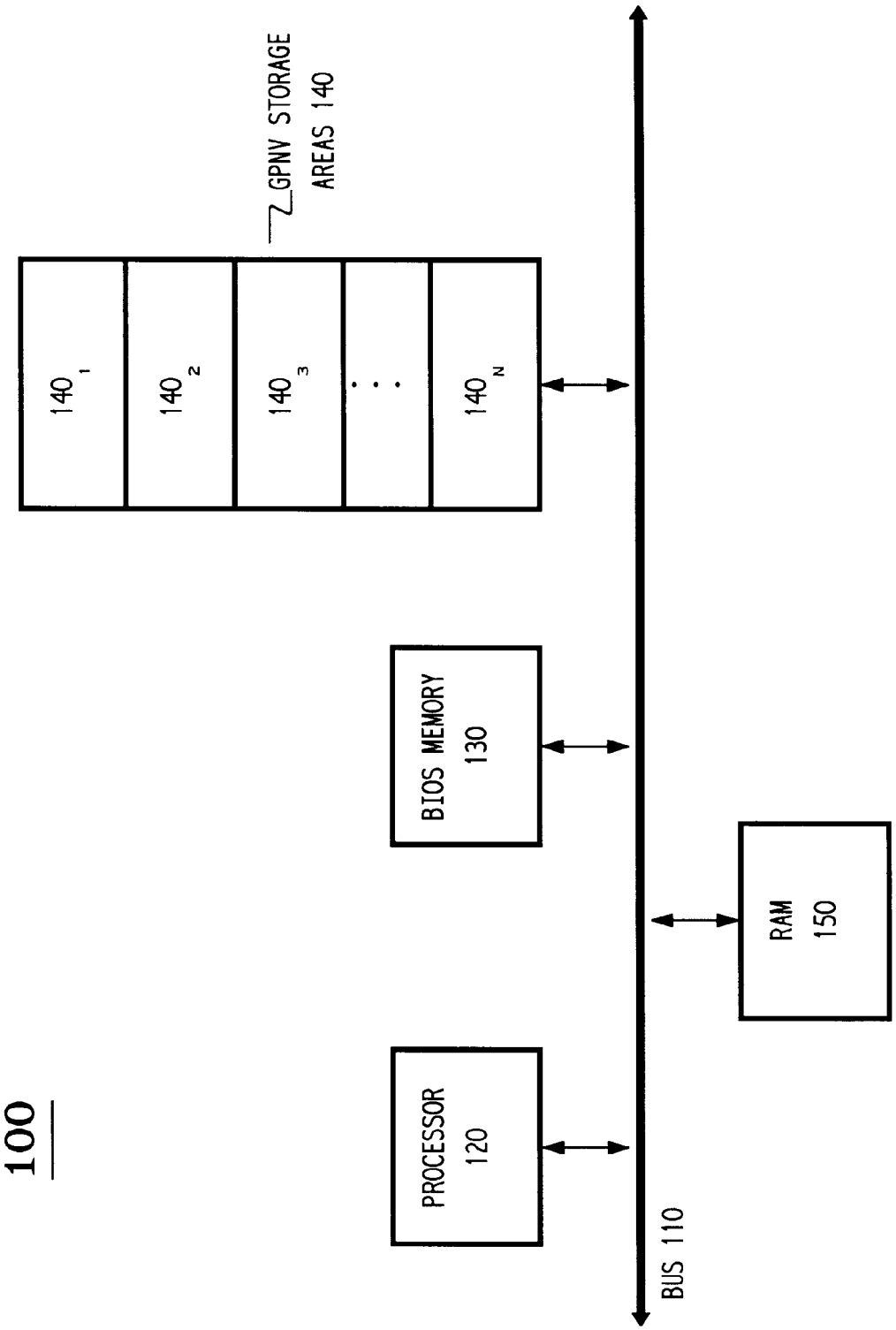
FIG. 1 shows a block diagram of a computer system in accordance with an embodiment of the present invention.

The present invention provides a mechanism for protecting data saved in a storage area from unauthorized writes by using hidden headers. Requests from a caller to write data to the storage area are allowed only if the call supplies header data that matches the master header data stored in the storage area. When a request is received by BIOS from a caller to perform a read of data from the storage area, BIOS strips off the master header data stored in the storage area and sends alternate header data back with the rest of the data from the storage area to the caller, thereby preventing the caller from learning of identity of the master header data. When a call is received requesting a write of new data to the storage area, the write is permitted only if the data supplied by the caller contains a caller header data that matches the master header data. The above-described mechanism is implemented, in one embodiment, on a computer system such as computer system 100 depicted in block diagram form in FIG. 1.

System Hardware

Computer system 100 comprises a bus 110, a processor 120, a BIOS memory 130, GPNV data storage 140, and a random access memory (RAM) 150, interconnected as shown. The BIOS memory 130 stores a sequence of instructions (sometimes referred to as the BIOS) which allows the processor 120 to input data from and output data to input/output (I/O) devices such as display devices and mass storage devices (not shown). In one embodiment, when the system 100 is reset, the contents of BIOS memory 130 are copied into RAM 150 for access by the processor 120. Alternatively, processor 120 may access the BIOS memory 130 directly via bus 110. The BIOS memory 130 can be any of a wide variety of conventional nonvolatile data storage devices, such as a read only memory (ROM), Flash memory (sometimes referred to as Flash devices), an erasable programmable read only memory (EPROM) or an electrically erasable programmable read only memory (EEPROM).

In one embodiment of the present invention, the BIOS stored in BIOS memory 130 is compliant with the DMI BIOS Specification. The DMI BIOS Specification includes a DMI, which uses GPNV data areas, shown in FIG. 1 as GPNV storage areas 140. Thus, when an application desires access to the GPNV storage areas 140, it must issue one or more DMI calls to one of the procedures provided by the BIOS. These procedures are described in more detail below.

Multiple GPNV storage areas 140 can be used in a computer system. The system 100 as shown includes n GPNV storage areas 140. In one implementation, n is equal to three. Each of the GPNV areas 140 can be of any size. The GPNV storage areas 140 can be used to store any of a wide variety of information. In one embodiment, the GPNV storage areas 140 are used to store data relating to the identification of hardware components in the system 100. For example, this identification can include the serial numbers and model numbers of each piece of hardware (e.g., display devices, mass storage devices, multimedia cards, and the like) in the system 100.

DMI Function Calls

DMI supports a structure access interface and a GPNV storage interface. Various types of information may be stored in GPNV memory and accessed by the GPNV storage interface, for example through DMI functions 56h (Read GPNV), which reads the entire specified GPNV contents into a buffer specified by the caller; and 57h (Write GPNV), which copies the contents of a user-specified buffer into the specified GPNV memory. Such function calls contain a "handle" to the GPNV storage area of which the read (or write) is requested, and the address of a buffer in which the data is to be stored (or containing the new data to be written). DMI function 55h (Get GPNV Information) returns information to a caller about a specified GPNV storage area. The information stored in GPNV storage areas may include manufacturing information, such as the serial number of the motherboard. Data stored in GPNV storage areas that is accessible via the GPNV storage interface will be referred to herein as GPNV data.

"Structures," sometimes referred to as strings because of the strings of data stored therein, may also be stored in GPNV memory and accessed by the structure access interface, for example through DMI function 52h (Set DMI Structure), which copies the information for the specified DMI structure from the buffer specified by the caller. These structures are organized in Types and may also contain sensitive information. These Types include system information (Type 1), which defines attributes of the overall system; base board information (Type 2), which defines attributes of the system's baseboard, also known as the motherboard or planar; and system enclosure or chassis information (Type 3), which defines attributes of the system's mechanical enclosures. Each DMI structure has a formatted section and an optional unformatted section. The formatted section of each structure begins with a 4-byte header. Remaining data in the formatted section is determined by the structure Type, as is the overall length of the formatted section. The unformatted section of the structure is used for passing variable data such as text strings. A DMI_Bad_Parameter return code (value 84h) is returned after various calls are made, to indicate an invalid parameter or, in the case of a DMI function 52h (Set DMI Structure), to indicate an invalid value detected for a to-be-changed structure field. Data stored in DMI structures, which may be stored within a dedicated GPNV storage area, will be referred to herein as structure data.

DMI also provides a control function 54h, which provides an interface to perform implementation-specific functions, as defined by a SubFunction parameter and its optional Data values. In particular, SubFunction range 4000h–FFFFh is reserved for use by BIOS.

In one embodiment, one of the GPNV areas 140 is 128 bytes, a second is 256 bytes, and a third is 384 bytes. The GPNV storage areas 140 can be implemented using any of a wide variety of nonvolatile storage devices, such as blocks of Flash memory cells, EEPROMs, battery-backed complimentary metal oxide semiconductor (CMOS) cells, and the like. Each GPNV storage area may be identified using a 4-byte ASCII identifier. Thus, GPNV storage area $140_1$ may identified by the identifier "ABCD", storage area $140_2$ by "ABXY", and storage area $140_3$ by "GGYN". In one embodiment, GPNV storage area $140_1$ is a 256-byte storage area used by the BIOS for storing a backup image of CMOS-related information; GPNV storage area $140_2$ is a 128-byte storage area used by the manufacturer for storing process and test data; and GPNV storage area $140_3$ is a 384-byte storage area used by DMI BIOS extensions for storing DMI-related information such as manufacturer ID, serial numbers, asset tags, and chassis information, which may be read using the DMI function call 56h (Read GPNV Data) or 51h (Get DMI Structure) and written with DMI function call 52h (Set DMI Structure). Thus, GPNV storage area $140_3$ may be utilized to store the structure data of Types 1, 2, and 3, described previously.

In one embodiment, GPNV storage area $140_3$ stores a 4-byte header plus four strings for each of Types 1, 2, and 3 structures, in addition to other information. In one embodiment, GPNV storage area $140_3$ stores, at predetermined offsets, the following strings as illustrated in Table 1, in addition to other information:

TABLE 1

| Name | Structure Type | String Number |
|---|---|---|
| System Info Manufacturer | 1 | 1 |
| System Info Product Name | 1 | 2 |
| System Info Version | 1 | 3 |
| System Info Serial Number | 1 | 4 |
| Base Board Manufacturer | 2 | 1 |
| Base Board Product | 2 | 2 |
| Base Board Version | 2 | 3 |
| Base Board Serial Number | 2 | 4 |
| Chassis Manufacturer | 3 | 1 |
| Chassis Version | 3 | 2 |
| Chassis Serial Number | 3 | 3 |
| Chassis Asset Tag | 3 | 4 |

Hidden Headers

Referring now to FIG. 2, there is shown a flow chart illustrating a method 200 of protecting storage areas such as GPNV storage areas 140 from unauthorized writes by using hidden headers, in accordance with an embodiment of the present invention.

As shown in FIG. 2, a call is made by a caller to write data in certain GPNV storage areas (step 210). In one embodiment, the data to be updated by the write call is GPNV data stored in GPNV storage areas $140_1$ (CMOS data) or $140_2$ (manufacturing data). If the caller desires to update GPNV data in one of these GPNV storage area, a DMI function call 57h will be received by BIOS to instruct BIOS to copy the contents of a caller-specified buffer into the specified OPNV storage area. Write calls using function call 57h to modify GPNV storage area $140_3$ are not permitted by BIOS in one embodiment.

As explained previously, each storage area contains a 4-byte header. Each 4-byte header for a particular GPNV storage area is considered to be the "master header data" for that GPNV storage area. In the present invention, a request from a caller to write data to a specified GPNV storage area is allowed only if the call supplies header data that matches the master header data currently stored in the storage area. For example, as described above, GPNV storage area 140₁ may identified by the identifier "ABCD", and storage area 140₂ by "ABXY". If a function 57h write call specifying data to be written into GPNV storage area 140₁ does not contain the header data "ABCD", then BIOS does not allow the write, rejects the call and returns a DMI_Bad_ Parameter error to the caller. Thus, any user or caller not having knowledge of the identity of the master header data for a GPNV storage area will not be able to successfully call function 57h.

This master header data is kept confidential so that unauthorized users are not able to modify these storage areas as by supplying the correct master header data. However, to prevent a caller from obtaining this header data by making a DMI function call 56h (Read GPNV), which normally reads the entire specified GPNV contents into a buffer specified by the caller, including any header data, BIOS strips off the master header data stored in the storage area and sends alternate header data back with the rest of the data from the storage area to the caller, thereby preventing the caller from learning of identity of the master header data. The alternate header data, in one embodiment, is simply mask or "dummny" header data such as the string FFh. For example, if a function 56h call specifies a read of data from GPNV storage area 140₁, BIOS strips the header data "ABCD" and replaces it with FFh before returning the contents of the storage area to the buffer specified by the caller.

Thus, method 200 operates as follows. A call to read a GPNV storage area is received (step 201). BIOS replaces the master header data with alternate header data, and returns the altered GPNV data to the caller (steps 202, 203). A call is received to write new data to the GPNV storage area, the call containing caller header data (step 210). If the caller header data matches the master header data for that GPNV storage area, then the new data is written in the GPNV storage area (steps 211, 212). Otherwise, the write call is rejected and a DMI_Bad_Parameter returned to the caller (steps 211, 213).

In the discussions above, the present invention is described with reference to DMI and the DMI BIOS Specification. It is to be appreciated, however, that the present invention is not limited to computer systems operating in accordance with the DMI BIOS Specification or with DMI, but is also applicable to systems with a BIOS which supports lock values in substantially the same manner as DMI.

In one embodiment, method 200 is implemented through a sequence of instructions executed on the processor 120. Initially, the sequence of instructions is stored in the BIOS memory 130. When the computer system is reset, the instructions are copied from the BIOS memory 130 into the RAM 150 and then accessed and executed by the processor 120. In another embodiment, the sequence of instructions is stored on another nonvolatile memory device which is part of or is coupled to the system 100, such as a hard disk, an optical disk, or a removable floppy disk. The sequence of instructions can be loaded into the RAM 150 after an initial portion of the BIOS which includes instructions on how to access the memory device (e.g., the hard disk) has been loaded into the RAM 150. Thus, as will be appreciated, method 200 may be implemented in a DMI BIOS extension.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for preventing unauthorized write access to a storage area in a computer system, the method comprising the steps of:

(a) receiving a request from a caller to perform a read of data from the storage area, the data having master header data in a header portion;

(b) replacing the master header data with alternate header data before returning the data to the caller;

(c) returning the data, including the alternate header data, to the caller;

(d) receiving a request from the caller to perform a write of caller data to the storage area, the caller data having caller header data in a header portion of the caller data; and (e) allowing the write of caller data only if the caller header data is identical to the master header data.

2. The method of claim 1, wherein steps (a)–(e) are performed under the control of a basic input/output system (BIOS).

3. The method of claim 1, wherein the storage area is a general purpose non-volatile (GPNV) storage area.

4. The method of claim 1, wherein the master header data is a confidential header.

5. In a computer system, a subsystem for preventing unauthorized write access to a storage area of the computer system, the subsystem comprising:

(a) means for receiving a request from a caller to perform a read of data from the storage area, the data having master header data in a header portion;

(b) means for replacing the master header data with alternate header data before returning the data to the caller;

(c) means for returning the data, including the alternate header data, to the caller;

(d) means for receiving a request from the caller to perform a write of caller data to the storage area, the caller data having caller header data in a header portion of the caller data; and (e) means for allowing the write of caller data only if the caller header data is identical to the master header data.

6. The subsystem of claim 5, wherein steps (a)–(e) are performed under the control of a BIOS.

7. The subsystem of claim 5, wherein the storage area is a GPNV storage area.

8. The subsystem of claim 5, wherein the master header data is a confidential header.

9. A computer-readable medium having stored thereon a plurality of instructions, wherein the plurality of instructions, when executed by a processor of a computer system having a storage area, cause the processor to perform the steps of:

(a) receiving a request from a caller to perform a read of data from the storage area, the data having master header data in a header portion;

(b) replacing the master header data with alternate header data before returning the data to the caller;

(c) returning the data, including the alternate header data, to the caller;

(d) receiving a request from the caller to perform a write of caller data to the storage area, the caller data having caller header data in a header portion of the caller data; and (e) allowing the write of caller data only if the caller header data is identical to the master header data.

10. The computer-readable medium of claim 9, wherein steps (a)–(e) are performed under the control of a BIOS.

11. The computer-readable medium of claim 9, wherein the storage area is a GPNV storage area.

12. The computer-readable medium of claim 9, wherein the master header data is a confidential header.

13. A computer system, comprising: a processor;

a storage area coupled to the processor;

a BIOS stored in memory coupled to the processor, the BIOS including instructions which, when executed by the processor, cause the processor to:

(a) receives a request from a caller to perform a read of data from the storage area, the data having master header data in a header portion;

(b) replaces the master header data with alternate header data before returning the data to the caller;

(c) returns the data, including the alternate header data, to the caller;

(d) receives a request from the caller to perform a write of caller data to the storage area, the caller data having caller header data in a header portion of the caller data; and (e) allows the write of caller data only if the caller header data is identical to the master header data.

14. The computer system of claim 13, wherein the storage area is a GPNV storage area.

15. The computer system of claim 13, wherein the master header data is a confidential header.

* * * * *